(12) United States Patent
Williams et al.

(10) Patent No.: US 6,746,035 B1
(45) Date of Patent: Jun. 8, 2004

(54) TRACTOR TRAILER ANTI-JACKKNIFING ASSEMBLY

(75) Inventors: Norman L. Williams, North Vancouver (CA); Colin V. Hall, Vancouver (CA); Patrick Riebalkin, Abbotsford (CA); Richard P. Craig, North Vancouver (CA); Ian Pallett, Bellingham, WA (US); James B. Long, Bellingham, WA (US)

(73) Assignee: Semi Transportation Systems, Ltd., East Brunswick, NJ (US)

( * ) Notice: Subject to any disclaimer, the term of this patent is extended or adjusted under 35 U.S.C. 154(b) by 0 days.

(21) Appl. No.: 10/019,983
(22) PCT Filed: Jun. 2, 2000
(86) PCT No.: PCT/CA00/00676
§ 371 (c)(1), (2), (4) Date: Apr. 16, 2002
(87) PCT Pub. No.: WO01/03994
PCT Pub. Date: Jan. 18, 2001

Related U.S. Application Data
(60) Provisional application No. 60/143,218, filed on Jul. 9, 1999.

(51) Int. Cl.$^7$ ................................................. B62D 53/06
(52) U.S. Cl. .................... 280/432; 280/446.1; 280/433; 280/455.1
(58) Field of Search ................................ 280/432, 433, 280/434, 446.1, 455.1

(56) References Cited

U.S. PATENT DOCUMENTS

| | | | |
|---|---|---|---|
| 3,063,739 A | 11/1962 | Davies .................... 280/432 |
| 4,790,556 A | * 12/1988 | Hawkins et al. ........... 280/432 |
| 4,934,727 A | 6/1990 | Hawkins et al. ........... 280/432 |
| 4,986,560 A | * 1/1991 | Tambay .................... 280/432 |
| 5,232,239 A | 8/1993 | Hawkins et al. ........... 280/432 |

* cited by examiner

Primary Examiner—Lesley D. Morris
Assistant Examiner—L Lum
(74) Attorney, Agent, or Firm—Lerner, David, Littenberg, Krumholz & Mentlik, LLP

(57) ABSTRACT

An anti-jackknifing apparatus is disclosed for reducing articulation between a tractor having a fifth wheel and a trailer having a king pin. The anti-jackknifing apparatus comprises a rotatable shaft, a lug mounted on the shaft and a rotary actuator operatively engaged with the shaft.

20 Claims, 16 Drawing Sheets

TRACTOR TRAILER ANTI-JACKKNIFING ASSEMBLY

This application claims benefit of No. 60/143,218, filed Jul. 9, 1999.

TECHNICAL FIELD OF THE INVENTION

This invention relates to apparatus for preventing jackknife steering control loss on articulated vehicles as a result of jackknifing of the trailer. More particularly this invention relates to apparatus for limiting the articulation of a trailer by means of a stop element engaged in the forks of the fifth wheel.

BACKGROUND OF THE INVENTION

Environmental, traffic and public protection considerations, as well as the operational economies of preventing hazardous material spills in highway traffic fatalities by crash avoidance have become increasingly important, particularly to business involved with long distance highway cargo transport. The reduction of steering control loss through prevention of over-articulation or "jackknifing" of the tractor/trailer combination is one means of achieving those objectives.

As a tractor/trailer combination unit begins to lose control due to over articulation, the driver experiences the increasingly difficult challenge of maintaining steering control until articulation of the trailer to the tractor about the king-pin reaches a critical angle. Commonly known as "jackknifing", exceeding the "critical angle" causes the driver to lose complete steering control until the unit comes to rest, often with catastrophic results.

It is known in the prior art to provide anti-jackknifing apparatus which relies on the insertion of a stop element between the forks of the fifth wheel so as to limit the permitted articulation between the trailer and the tractor.

U.S. Pat. No. 3,837,678 to Cicero described a horizontally plunging piston with an enlarged head which engaged between the forks of the fifth wheel. U.S. Pat. No. 3,972,542 to Dirks et al. described a tapered head portion of an abutment element which extended horizontally into the forks of the fifth wheel, a slideway for the element and remote control features. U.S. Pat. No. 4,068,860 to Meyers et al. was directed to a horizontally extending abutment element which included a head portion shaped to engage both the inner and outer portions of the forks of the fifth wheel.

U.S. Pat. No. 4,700,966 to Hawkins et al. introduced the concept of a pivoting lug mounted on a transverse shaft which was driven by a hydraulic cylinder. The cylinder and the transverse shaft were mounted in a rearwardly extending support frame which included a mounting bar which in turn was attached to a portion of the trailer frame.

One disadvantage of the Hawkins approach is that the apparatus must be relatively long in order to accommodate the cylinder and support frame. As a result, the apparatus must generally be mounted below the floor beams of the trailer. This in turn reduces the clearance between the apparatus and the top of the fifth wheel. Alternatively the Hawkins unit is installed by cutting out a portion of the floor beams and tucking the unit into the resulting space.

An object of this invention is to provide improved apparatus which selectively prevents jackknifing of the trailer by means of a pivoting lug mounted on a transverse shaft.

It is a further object of this invention to provide such apparatus which can be supplied as a retrofit device on an existing upper coupler plate of a trailer.

It is yet a further object of this invention to provide a more compact apparatus than has been offered in the prior art and which is capable of fitting between the floor beams of a trailer without the need to cut the beams.

It is another object of this invention to provide means for preventing contamination of the operative components of the apparatus from dirt and other debris.

It is another object of this invention to provide apparatus which may be easily taken apart for repair or replacement of its component parts.

Other objects of the invention will be appreciated by reference to the detailed description of the preferred embodiment of the invention.

DETAILED DESCRIPTION OF THE BEST MODE AND PREFERRED AND ALTERNATIVE EMBODIMENTS OF THE INVENTION

Figure 1:
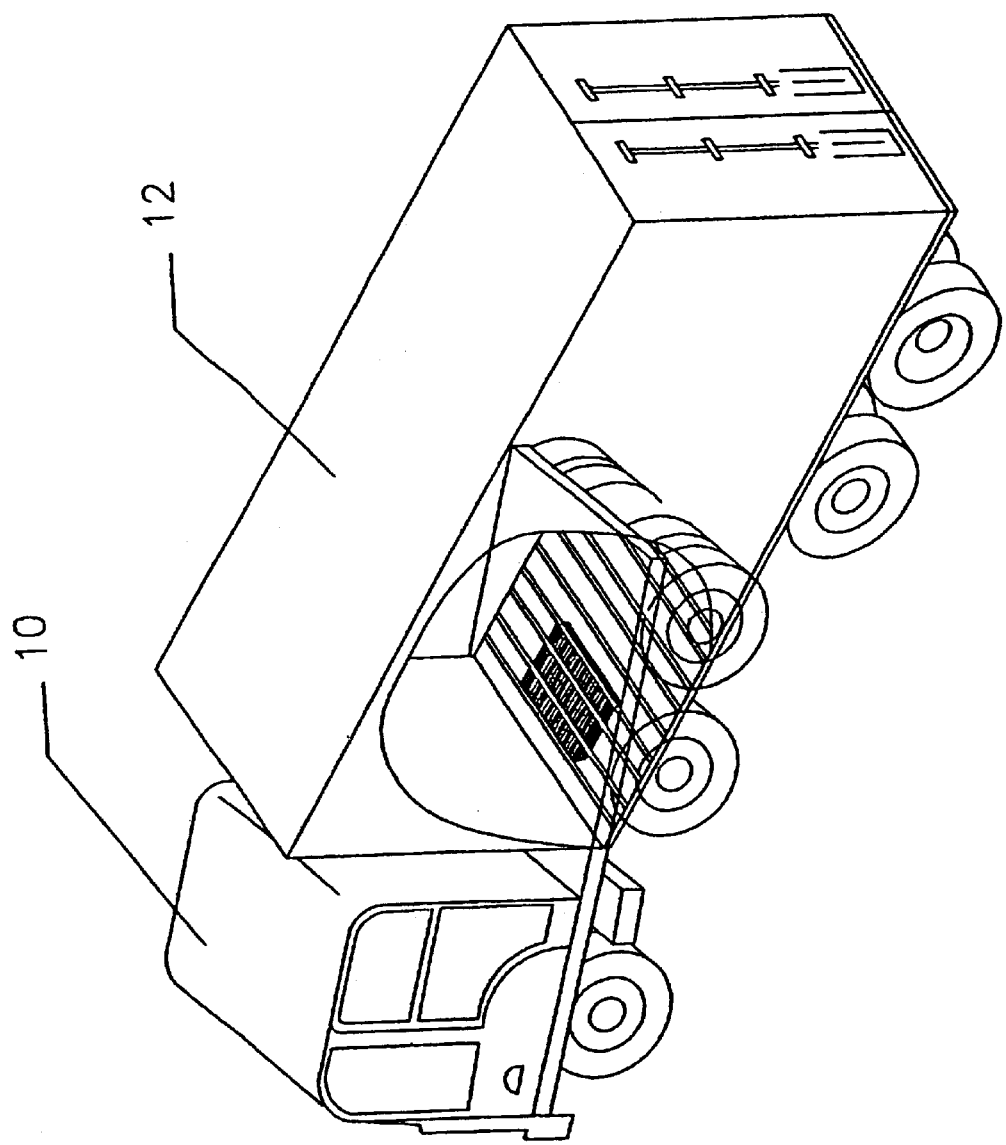
FIG. 1 is a diagram of a typical tractor-trailer combination unit, partially cut away to show the location of the upper coupler plate.
Figure 2:
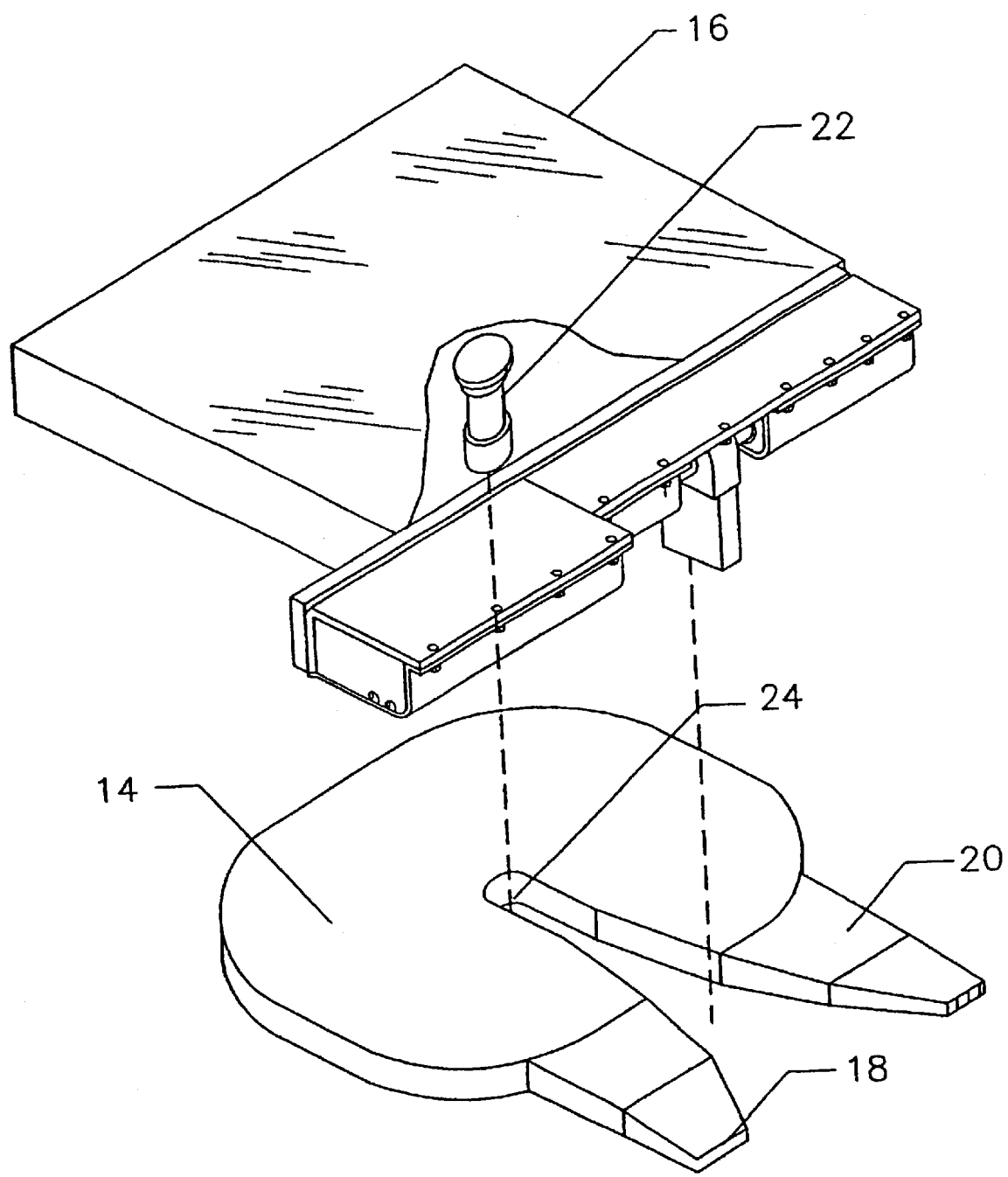
FIG. 2 is a perspective partially exploded view of a typical upper coupler plate along with the preferred embodiment of the invention mounted on the upper coupler plate, and of a fifth wheel.

Referring to FIGS. 1 and 2, a tractor-trailer unit comprises a tractor 10 and a trailer 12. The tractor includes a fifth wheel 14 and the trailer typically includes an upper coupler plate 16.

The fifth wheel 14 includes a V-shaped opening between two forks 18, 20 for receiving a king pin 22. The upper coupler plate 16 has a downward depending king pin 22 which engages in slot 24 between the forks 18, 20.

Figure 3:
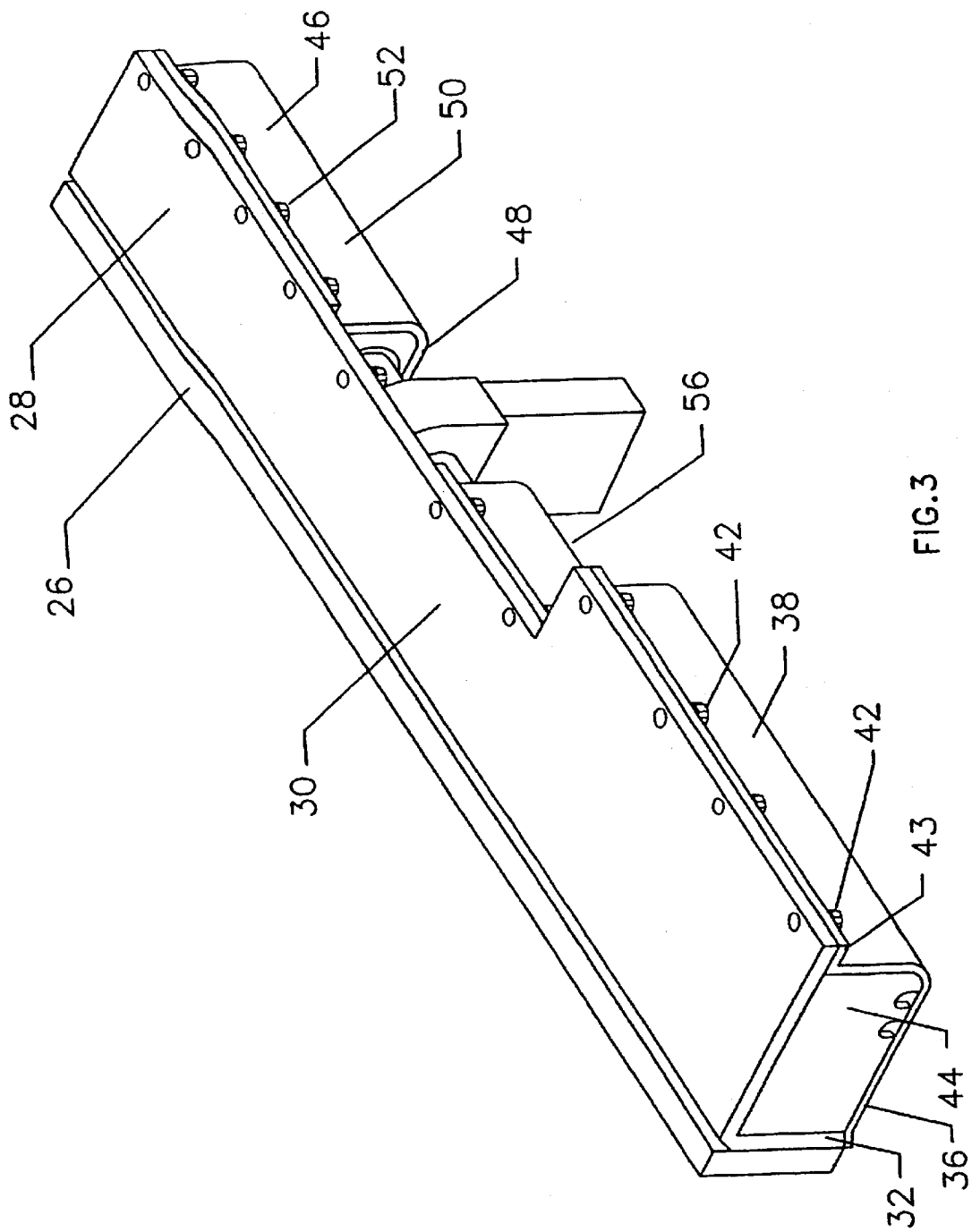
FIG. 3 is a perspective view of the preferred embodiment of the invention.

FIG. 3 is an aft perspective view illustrating the mounting plate 26 and the housing 28 for the anti-jackknifing apparatus according to the preferred embodiment of the invention. Mounting plate 26 is a rectangular plate for mounting against the aft wall of the upper coupler plate. Housing 28 comprises a top wall 30 and a front wall 32. Both the top wall 30 and the front wall 32 are formed as a single angle piece extending the transverse extent of the apparatus. Front wall 32 is intended to be secured in face to face relationship with the mounting plate 26.

A port section cover plate comprises a bottom wall 36 and an aft wall 38 which define a port section of the housing. Bottom wall 36 and aft wall 38 are formed as a single piece which is removably secured to the top wall 30 by means of bolts 42 engaged through a flange portion 43 of the aft wall 38. Port side wall 44 comprises a separate piece which is welded to bottom wall 36 and aft wall 38. It is not welded to top wall 30 or front wall 32.

A starboard section cover plate comprises a bottom wall 48 and an aft wall 50 which are formed as a single piece which is removably secured to the top wall 30 by means of bolts 52. The cover plate 46 defines a starboard section of the housing. A starboard side plate (not shown) is provided and is welded to the bottom wall 48 and the aft wall 50, but not the top wall 30 or the front wall 32.

A third cover plate 56 is located inwardly of the port cover plate 34. It similarly comprises a bottom wall and an aft wall and defines the third section of the housing.

As will be appreciated below, the removability of the port, starboard and third section cover plates contributes to the ease of repair and replacement of the operative components of the apparatus.

Figure 4:
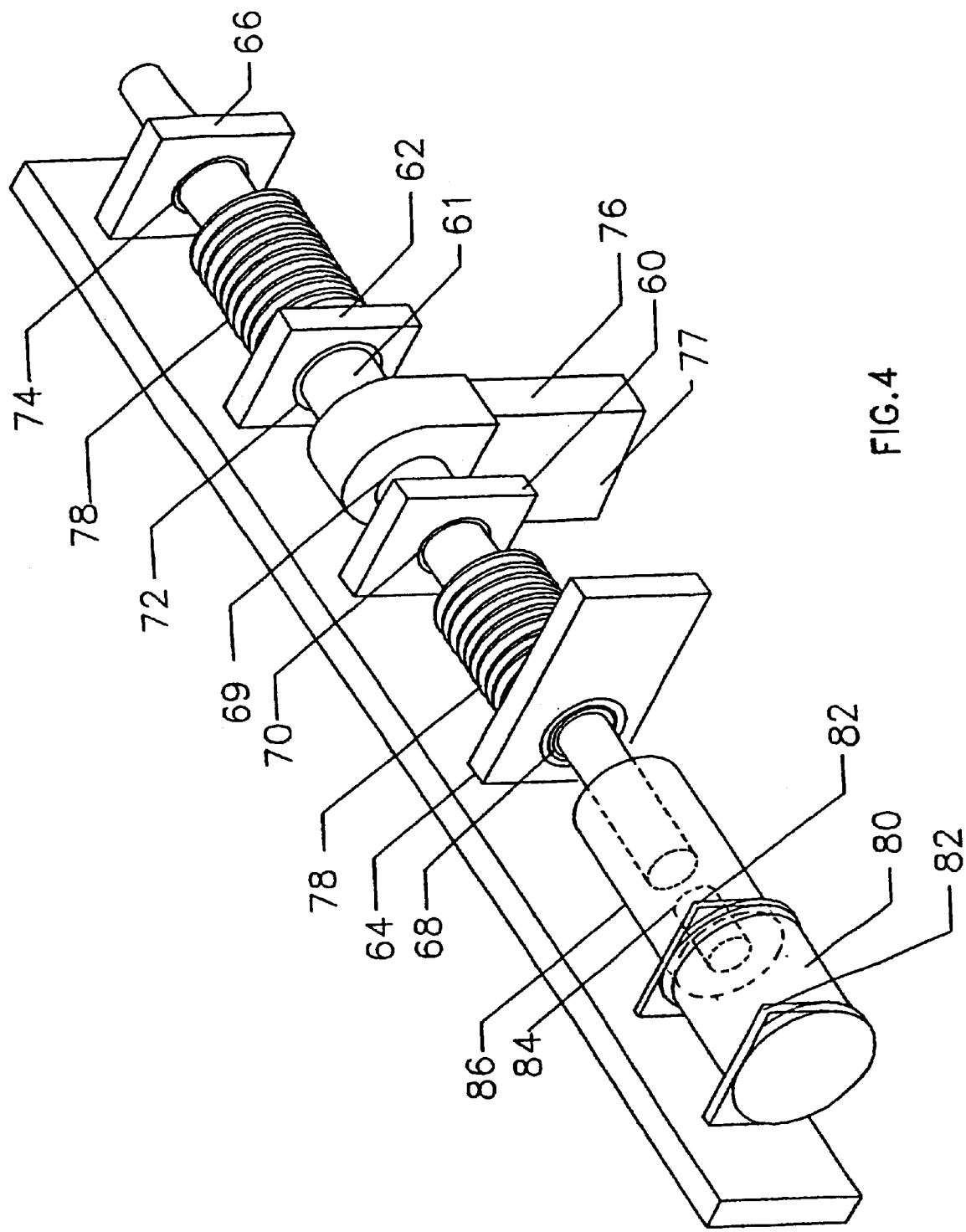
FIG. 4 is a perspective view of the operative components of the preferred embodiment of the invention with the housing cover plates removed.

Referring now to FIG. 4, the housing further includes two lug containment plates 60, 62 and two Belleville washer abutment plates 64, 66. The lug containment plates 60, 62 and the Belleville washer abutment plates 64, 66 extend downwardly and outward from the top wall 30 and front wall 32 and are welded to them.

Lug containment plate 60 acts as a side wall to third section 58. Lug containment plate 62 acts as a side wall to the starboard section of the housing. Belleville washer abutment plate 64 acts as a side wall for the port section of the housing and extends from the front wall 32 aftward of the third section 58. Belleville washer abutment plate 66 is contained within the starboard section of the housing.

A compound shaft 61 (described in more detail below) extends transversely of the apparatus through bearings 68, 70, 72, 74 which are seated in openings in the containment and abutment plates 60, 62, 64, 66. An elongated lug 76 is retained on the shaft between the lug containment plates 60 and 62. It is retained on the shaft by set screws (not shown). Upon rotation of the shaft, the extended portion 77 of the lug may be presented in the downward position shown in FIG. 4 in which case it is disposed between the forks 18, 20 of the fifth wheel. When the shaft is rotated upwards, the extended portion 77 of the lug is withdrawn from between the forks.

Figure 11:
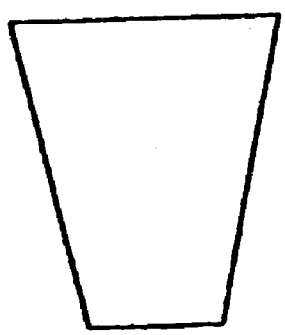
FIG. 11 is bottom end view of the lug of the preferred embodiment.
Figure 10:
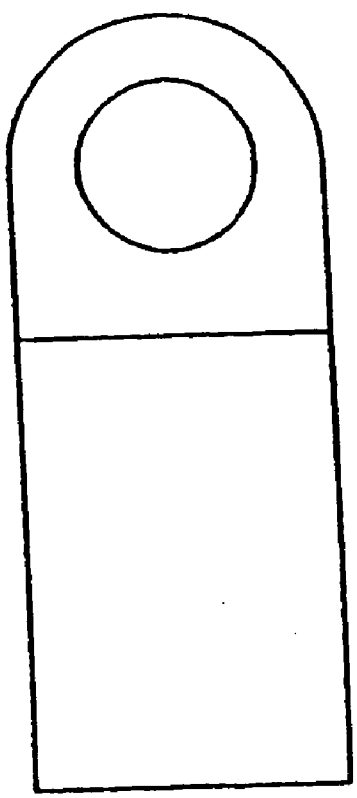
FIG. 10 is a side view of the lug of the preferred embodiment.

As best seen in FIG. 11, the extended portion 77 of the lug is tapered such that when the lug is disposed between the forks 18, 20 the orientation of its profile matches the orientation of the sides of the forks.

Referring again to FIG. 4, one set of Belleville washer rings 78 is provided on the shaft between abutment plate 64 and lug containment plate 60. Another set is provided between abutment plate 66 and lug containment plate 62. Belleville washers are resiliently compressible and have a resistance of up to 4300 lbs each.

The port section of the housing includes a pneumatically actuated quarter turn rotary actuator 80. Actuator 80 is mounted to the top plate 30 by brackets 82 extending upwards from the sides of the actuator. Actuator 80 is controlled by air pressure derived from a pneumatic control system described below.

Figure 9:
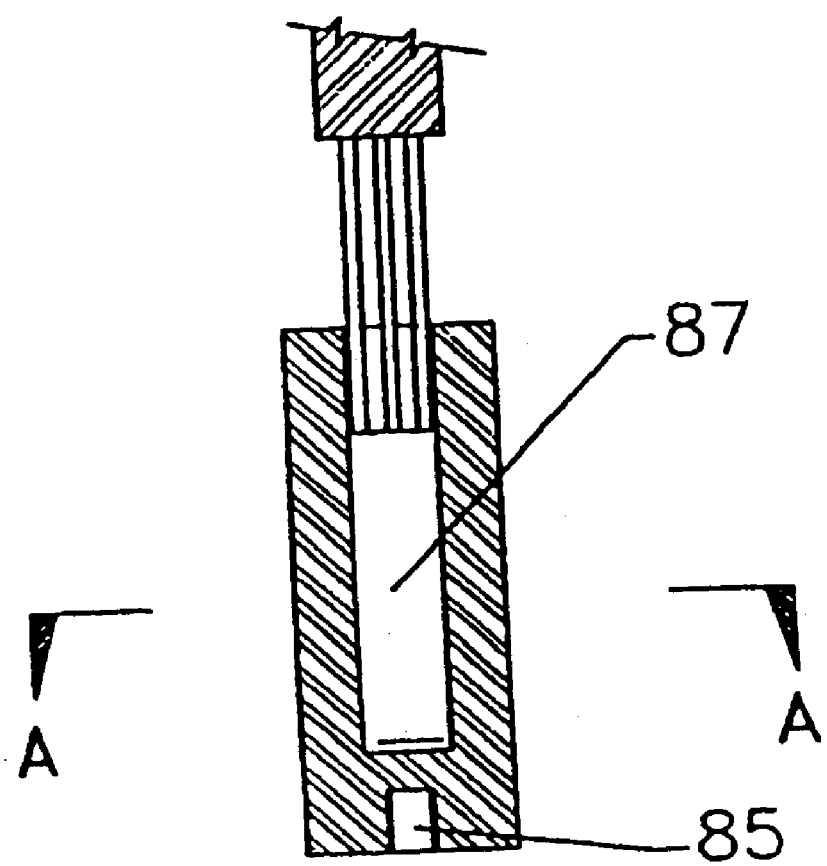
FIG. 9 is a longitudinal sectional view of the transition piece of the preferred embodiment.
Figure 9A:
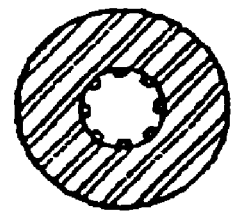
FIG. 9A is a cross sectional view taken along lines A—A of FIG. 9.

Actuator 80 includes an axial drive shaft 84 which extends in the direction of the shaft 61. A cylindrical key transition piece 86 is provided which has an outer diameter larger than both the shaft 61 and the shaft 84. One end of transition piece 86 is provided with an axial channel 85 (best seen in FIG. 9) whose dimension corresponds to the outer dimension of shaft 84. Transition piece 86 is retained on shaft 84 by means of set screws (not shown). Thus any rotation of shaft 84 is transmitted to transition piece 86. The other end of transition piece 86 is provided with a splined axial channel 87 (best seen in FIG. 9) into which is fitted shaft 61 whose end is similarly splined. Thus shaft 61 may slide axially along the longitudinal axis of the transition piece 86 while ensuring the transmission of the rotation of the transition piece to shaft 61.

Figure 5:
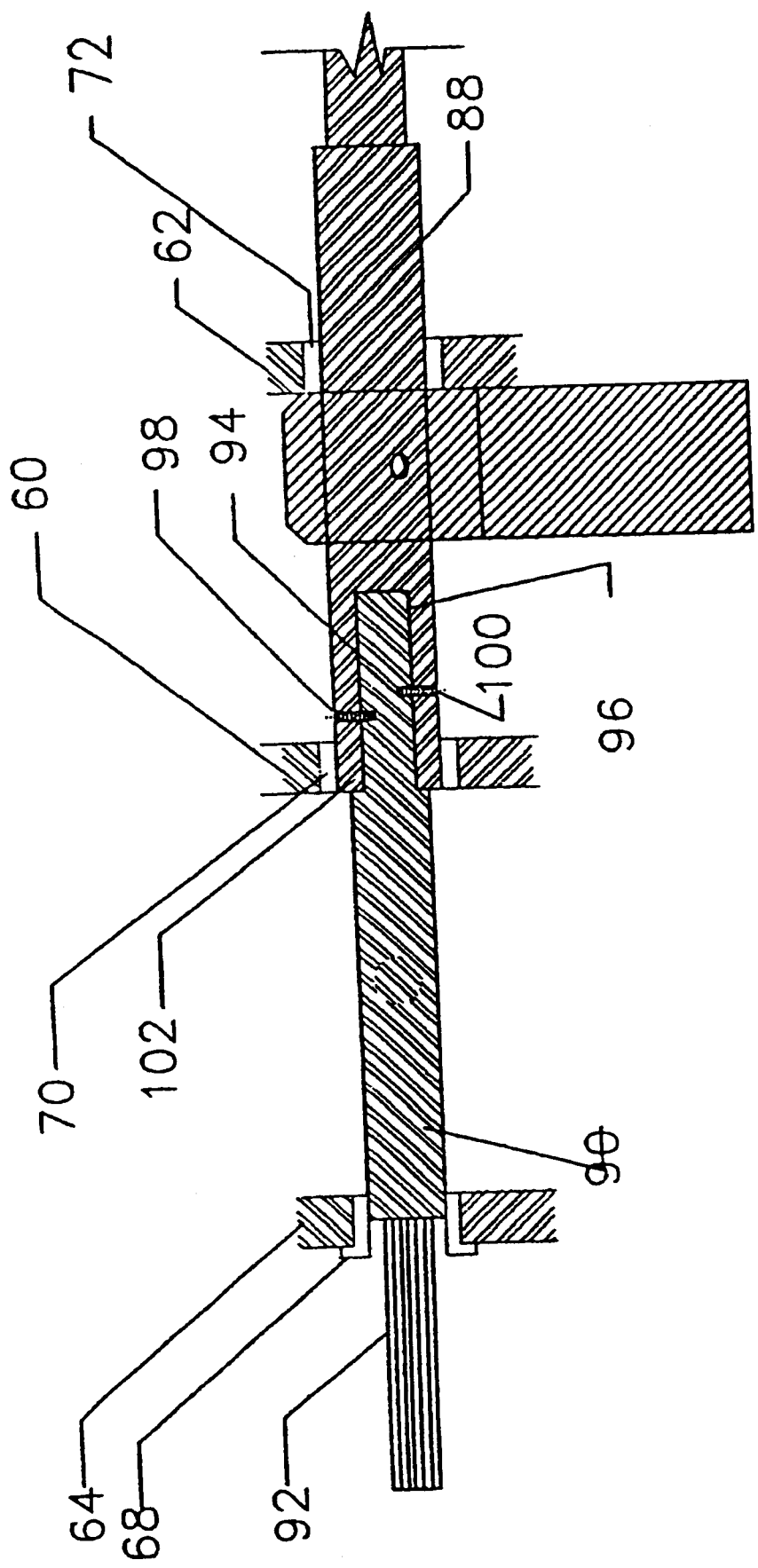
FIG. 5 is a longitudinal sectional view of the compound shaft according to the preferred embodiment of the invention, a portion of the lug containment plates and a portion of one of the Belleville abutment plates.

Referring now to FIG. 5, shaft 61 comprises a lug mounting section 88 having a 2 inch diameter, a Belleville washers mounting section 90 having a 1.5 inch diameter and an actuation section 92 having a 1 inch square cross section. Belleville mounting section 90 includes an extension 94 which is adapted to fit into a corresponding axial channel 96 in lug mounting section 88. Two set screws 98, 100 retain extension 94 in channel 96.

Lug mounting section 88 and Belleville washers mounting section 90 have lengths chosen to ensure that, even with the lug in abutment with lug containment plate 60 or 62, lug mounting section 88 will still be retained in bearing 70 or 72 (as the case may be) and Belleville washers mounting section 90 will still be retained in bearing 68 or 74 (as the case may be).

The differing diameters of sections 88 and 90 result in a shoulder 102. Shoulder 102 is relied on to provide an abutment surface between section 88 and the Belleville washers 78. Thus, lateral displacement of the lug will in turn cause axial displacement of section 88 and compression of the Belleville washers 78.

The reduced effective diameter of actuator section 92 allows for a smaller keyed transition piece 86 and therefore reduction in the weight of the overall apparatus.

A set of Belleville washers are mounted on Belleville washer mounting sections 90 between each Belleville washer abutment plate and each lug containment plate, i.e. between abutment plate 64 and containment plate 60 on the one hand, and between abutment plate 66 and containment plate 62 on the other hand.

When the lug is rotated on shaft 61 so as to be positioned downward and between the forks 18, 20 of the fifth wheel, over-articulation of the trailer in relation to the tractor will cause the lug to be displaced laterally, i.e. axially in relation to shaft 61.

Figure 6:
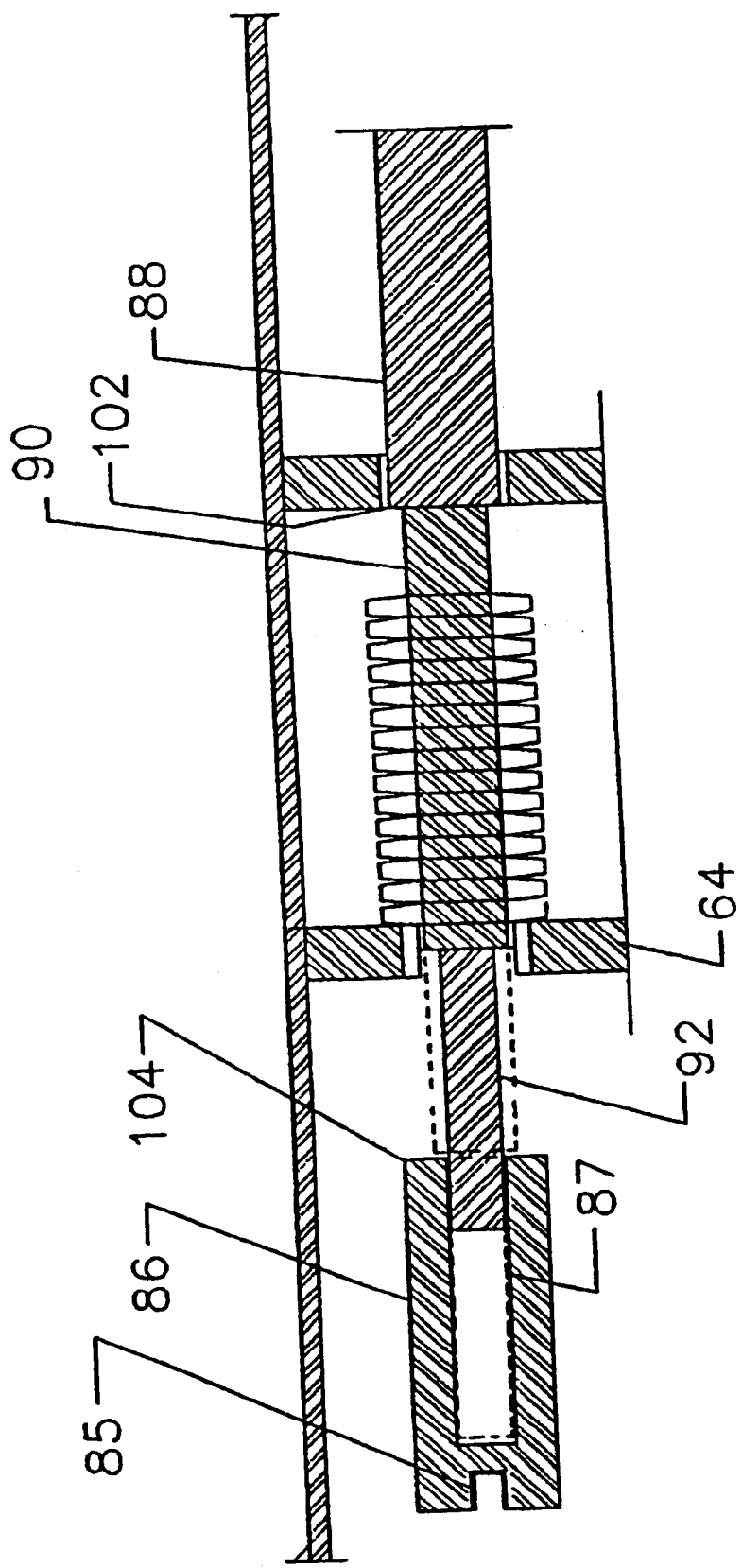
FIG. 6 is a longitudinal sectional view of the port side of the shaft, the port side Belleville washers and the actuator according to the preferred embodiment of the invention showing two extremes of axial displacement of the shaft.

FIG. 6 illustrates the relative positions of the components of the shaft in the extremes of axial shaft displacement allowed by the invention. The number of Belleville washers in sets 78 is chosen such that when they are not under compression they extend only a portion of the distance between the abutment plate and the containment plate. The lug is therefore permitted to undergo some lateral displacement before shoulder 102 causes the Belleville washers to compress and to increasingly resist further lateral displacement.

Lateral displacement of the lug and shaft 61 will be limited by the compression of the Belleville washers against the Belleville washers abutment plates, thereby preventing further articulation of the trailer and tractor.

In FIG. 6, the solid lines represent the position of extreme starboard displacement of the lug and shaft 61 while the dotted lines represent the position of extreme port side displacement. As can be seen, transition piece 86 and actuation section 92 of shaft 61 are made of such lengths that when shaft 61 undergoes maximum axial displacement in the direction of actuator 80, section 92 does not reach the end of channel 87. Similarly when the shaft 61 undergoes maximum axial displacement away from actuator 80, actuation section 92 is still retained within channel 87.

The distance between the shoulder 104 of transition piece 86 and the Belleville washers abutment plate 64 is made longer than the maximum starboard displacement of shaft 61 to avoid abutment of the end of Belleville washer mounting section 90 with shoulder 104 of the transition piece.

Figure 12:
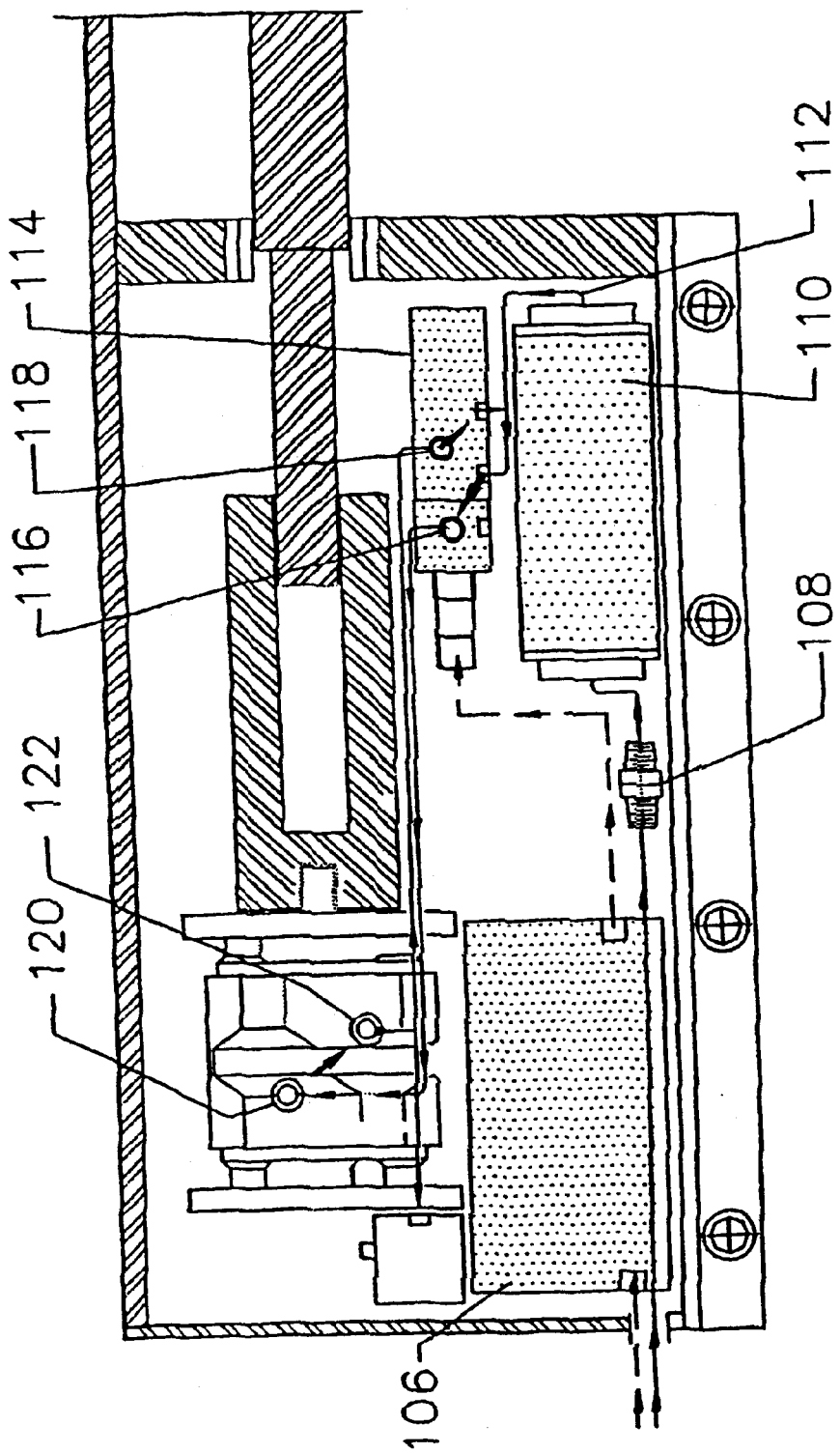
FIG. 12 is a sectional diagram of the port section of the housing including the control system components illustrating the energized mode for the lug (down position) for the preferred embodiment.
Figure 13:
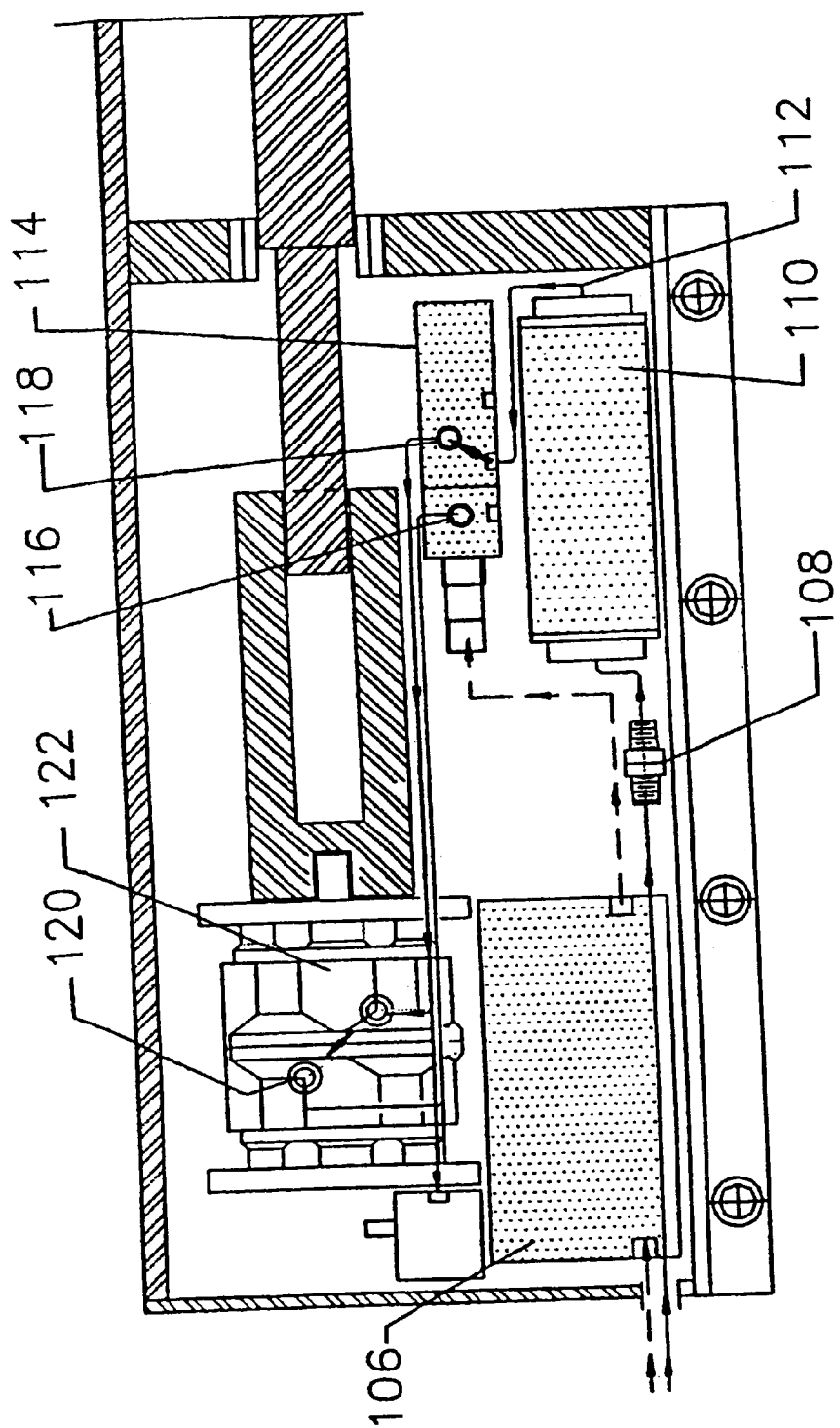
FIG. 13 is a sectional diagram of the port section including the control system components illustrating the de-energized mode for the lug (down position) for the preferred embodiment.

The control system according to the invention comprises radio frequency remote control between the cab and the control system which is mounted on bottom wall 36 of the housing 28. The control system is illustrated in FIGS. 12 and 13. It includes a receiver-transmitter 106 for both receiving instructions from the cab and for relaying to a receiver in the cab the energized or de-energized status of the control system (and by extension, an indication of whether the lug is engaged between the forks of the fifth wheel). A pressurized air supply derived from the tractor's air supply is fed through a check valve 108 to an air cylinder 110 which acts as a reserve air tank. A conduit 112 feeds pressurized air from the cylinder 110 to a solenoid valve 114 having two exit ports 116 and 118. Port 116 is in communication with port 120 of the actuator 80 and port 118 is in communication with port 122 of actuator 80. According to which port of actuator 80 is being fed pressurized air, actuator 80 will rotate shaft 61 (through the action of transition piece 86) in one direction or the other.

Figure 7:
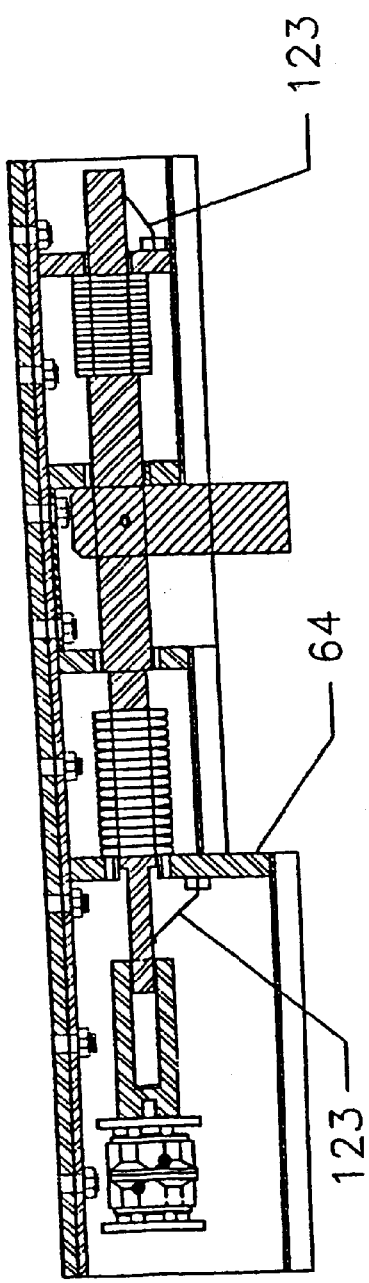
FIG. 7 is a longitudinal sectional view of the preferred embodiment of the invention showing maximum lateral displacement of the lug to starboard.
Figure 8:
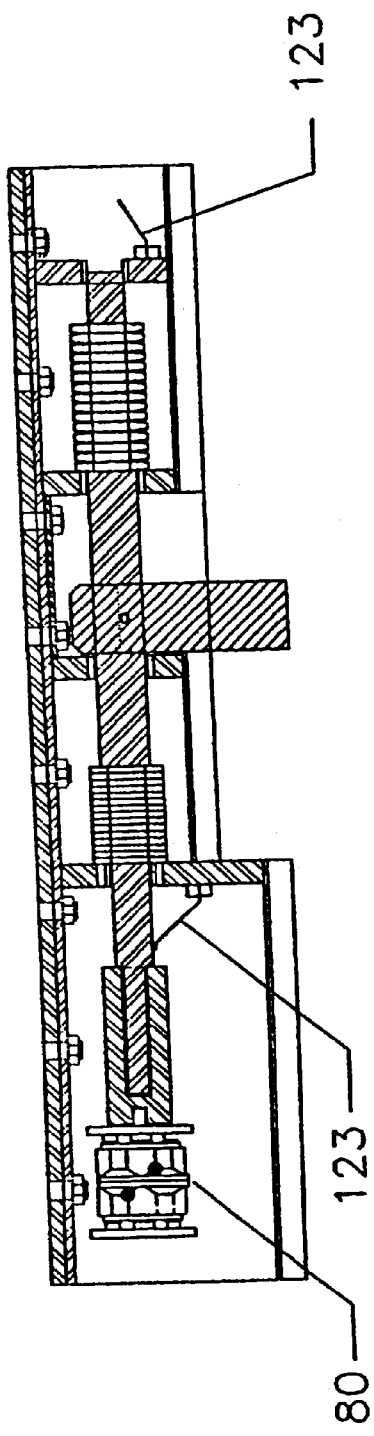
FIG. 8 is a longitudinal sectional view of the preferred embodiment of the invention showing maximum lateral displacement of the lug to port.

As best seen in FIG. 7 and FIG. 8, proximity switches 123 are provided to sense when the lug has been displaced a predetermined distance (preferably short of the maximum allowable displacement) by reason of the trailer beginning to over articulate. The proximity switch is preferably mounted on wall 64 with a sensing wand extending upwards such that when the shoulder between shaft 90 and extension 92 is displaced to the port side, the shoulder will enter into contact with the sensing wand. When the switch is activated the transmitter 106 transmits a signal to the cab control unit and audible and visible alarms are activated in the cab to warn the operator that the anti-jackknife control feature is approaching its limits. The operator then opts to either disengage or maintain the lug position. It will be appreciated that the proximity switch sensing wand can be positioned to be triggered at any desired degree of compression of the Belleville washers.

The invention can be retrofitted to an upper coupler plate of a trailer as follows. Mounting plate 26 is first welded to the front wall of the upper coupler plate 16 such that the center of the mounting plate is located directly above the center of the gap between the forks of the fifth wheel. Cover plate 30 and its associated abutment plates 64, 66 and containment plates 60, 62 is then secured to the mounting plate 26 by welding the front wall 32 to the mounting plate 26. Bearings 68, 70, 72 and 74 and installed in the plates.

Starboard side Belleville washer mounting section 91 of shaft 61 is then inserted from the port section 40 of housing 28, through bearings 68, 70 and 72 and partially through bearing 74. As it is passed between lug containment plate 62 and Belleville washers abutment plate 66, Belleville washers 80 are held so as to thread the section 91 through the Belleville washers 80.

Lug mounting section 88 is then inserted from the port section 40 through bearing 68 to be retained by bearings 70 and 72. As this is done, lug 76 is held such that section 88 is passed through hole 89 of lug 76. As section 88 is passed through bearings 70 and 72, the axial channel on the starboard side of section 88 will mate with the axial extension on section 91. Set screws (not shown) are then used to secure section 91 to section 88.

Section 90 is then passed from the port section of the housing through bearing 68 so as to cause extension 94 to mate with channel 96 of lug mounting section 88. Set screws 98, 100 are used to secure the two sections together. As section 90 is passed through bearing 68 and towards section 88, it is made to pass through Belleville washers 78.

Transition piece 86 is then slid onto section 92 of the shaft which is integrally formed with section 90. It is slid starboard so as to allow clearance for the insertion of actuator 80. Actuator 80 is then installed so as to thread shaft 84 into the channel 85 of section 92. Actuator 80 is then secured to top wall 30 by means of bolts through flanges 82 of the actuator brackets.

The cover plates 34 (and welded side plate 44), 56 and 46 (and its welded starboard side plate) may then be installed and secured by bolts to complete the installation.

In order to repair or replace components, substantially the reverse series of steps are performed. It will be appreciated that the compound shaft according to the invention plays an important role in allowing disassembly of the apparatus through the abutment and containment plates and within the limited space available to do so.

Figure 15:
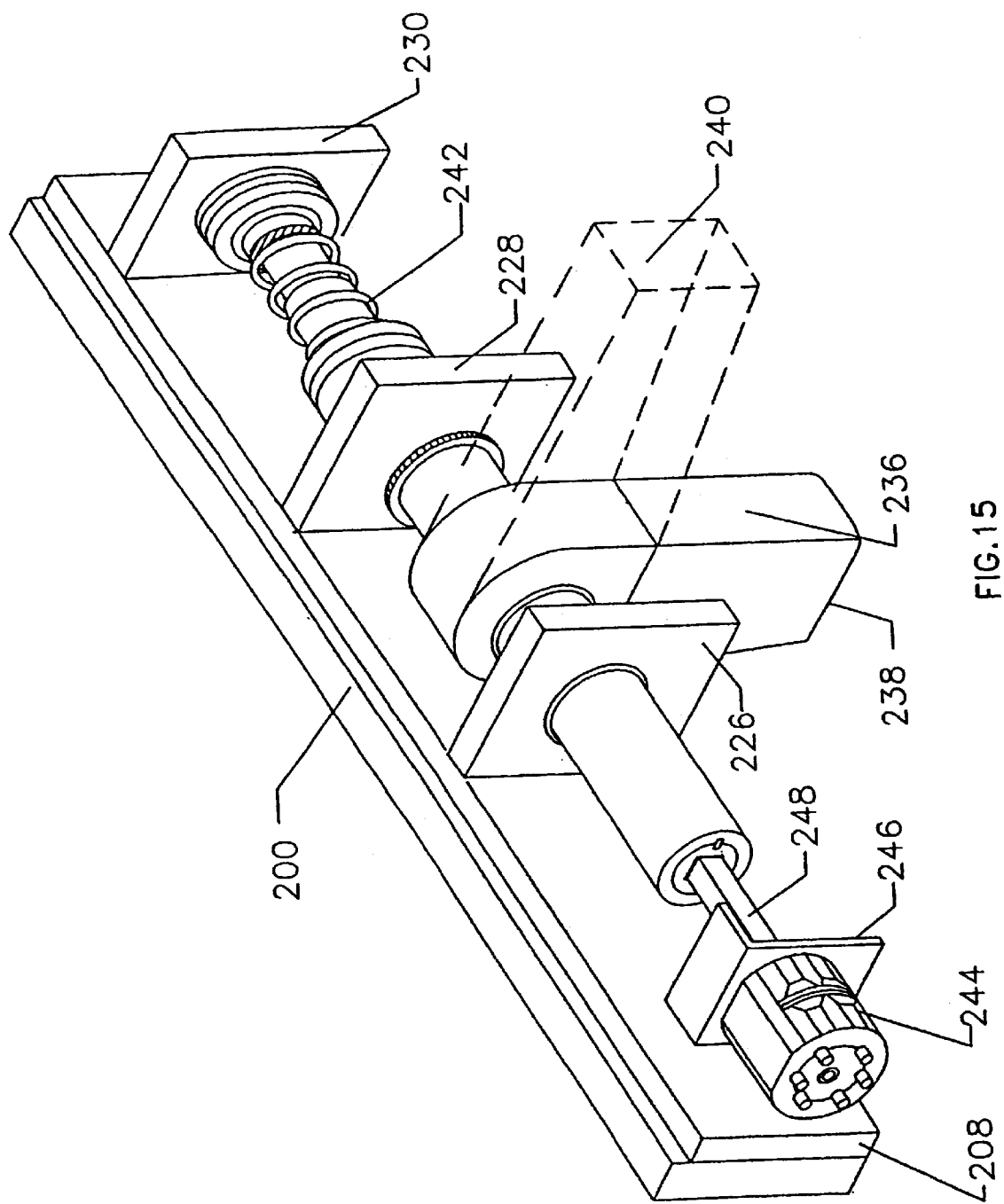
FIG. 15 is a perspective view of the housing and shaft according to the alternative embodiment with the housing covers removed.
Figure 16:
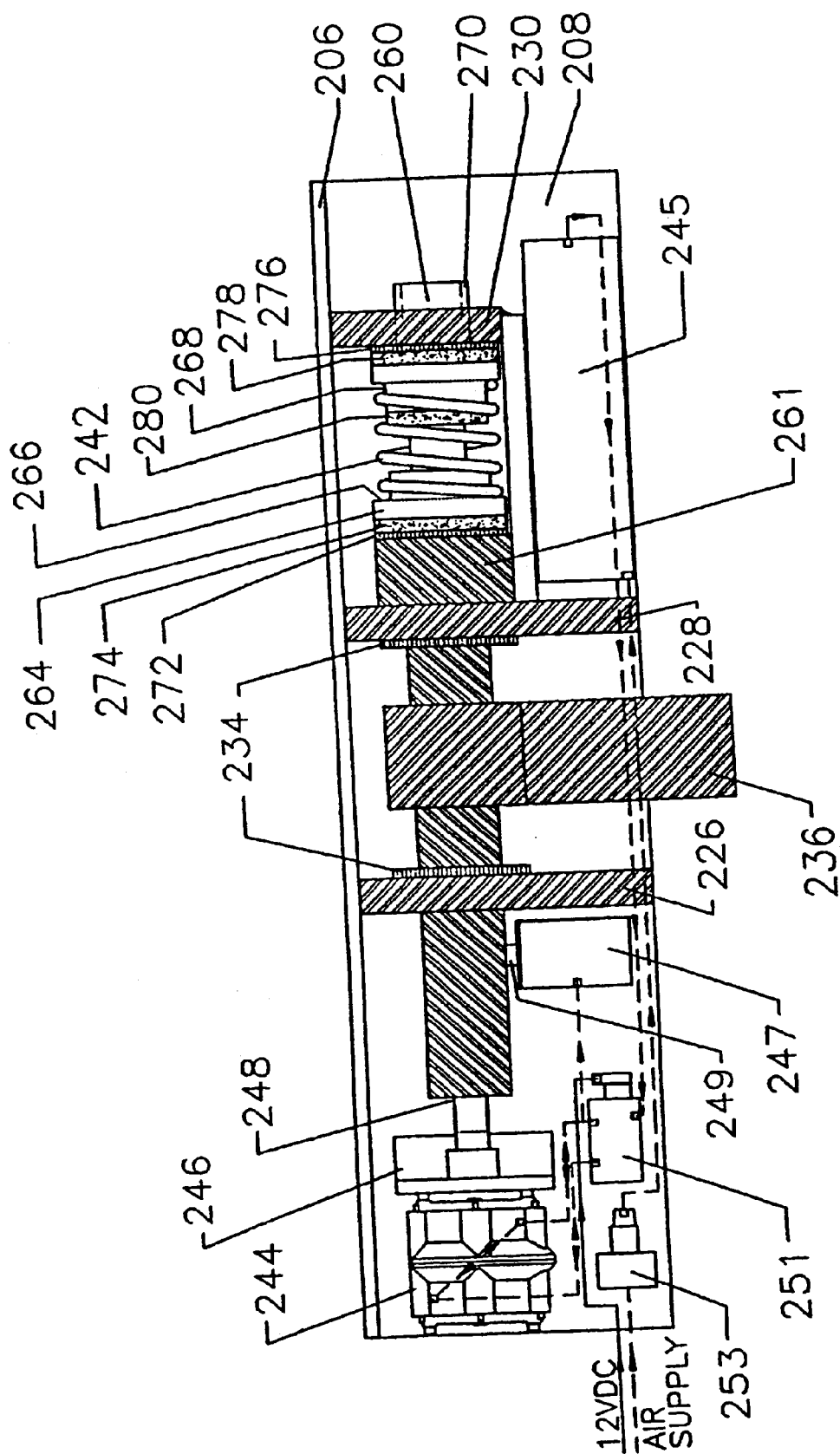
FIG. 16 is a aft view of the housing and shaft according to the alternative embodiment with the housing covers removed.
Figure 17:
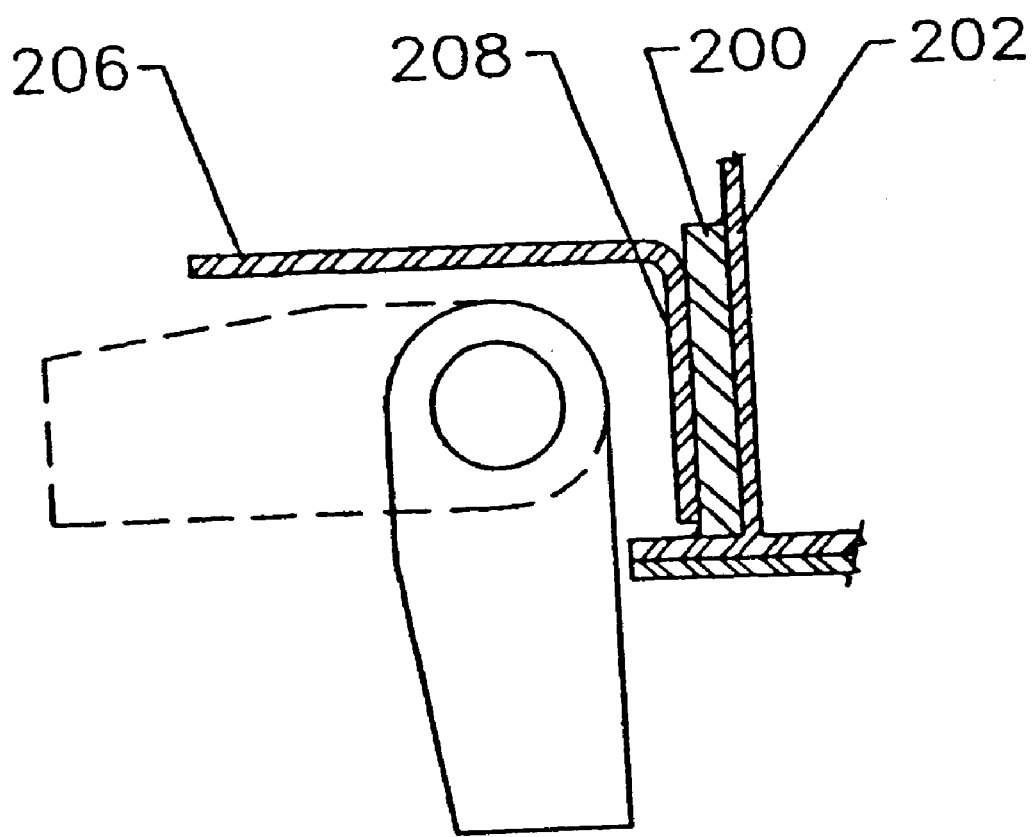
FIG. 17 is a cross sectional view of the mounting plate and top and front wall according to the alternative embodiment; and, FIG. 18 is a longitudinal cross sectional view of the alternative embodiment of the invention.

The alternative embodiment of the invention is illustrated in FIGS. 14 to 18. Referring first to FIG. 17, a rectangular mounting plate 200 mounts against the aft wall of one of the floor beams 202 forming the frame of the trailer. Alternatively the mounting plate may be mounted against a front wall of the upper coupler plate. A portion of the housing comprises a top wall 206 and a front wall 208 formed as a single angle piece extending the transverse extent of the apparatus. The front wall 208 is intended to be secured in face to face relationship with the mounting plate 200.

Figure 14:
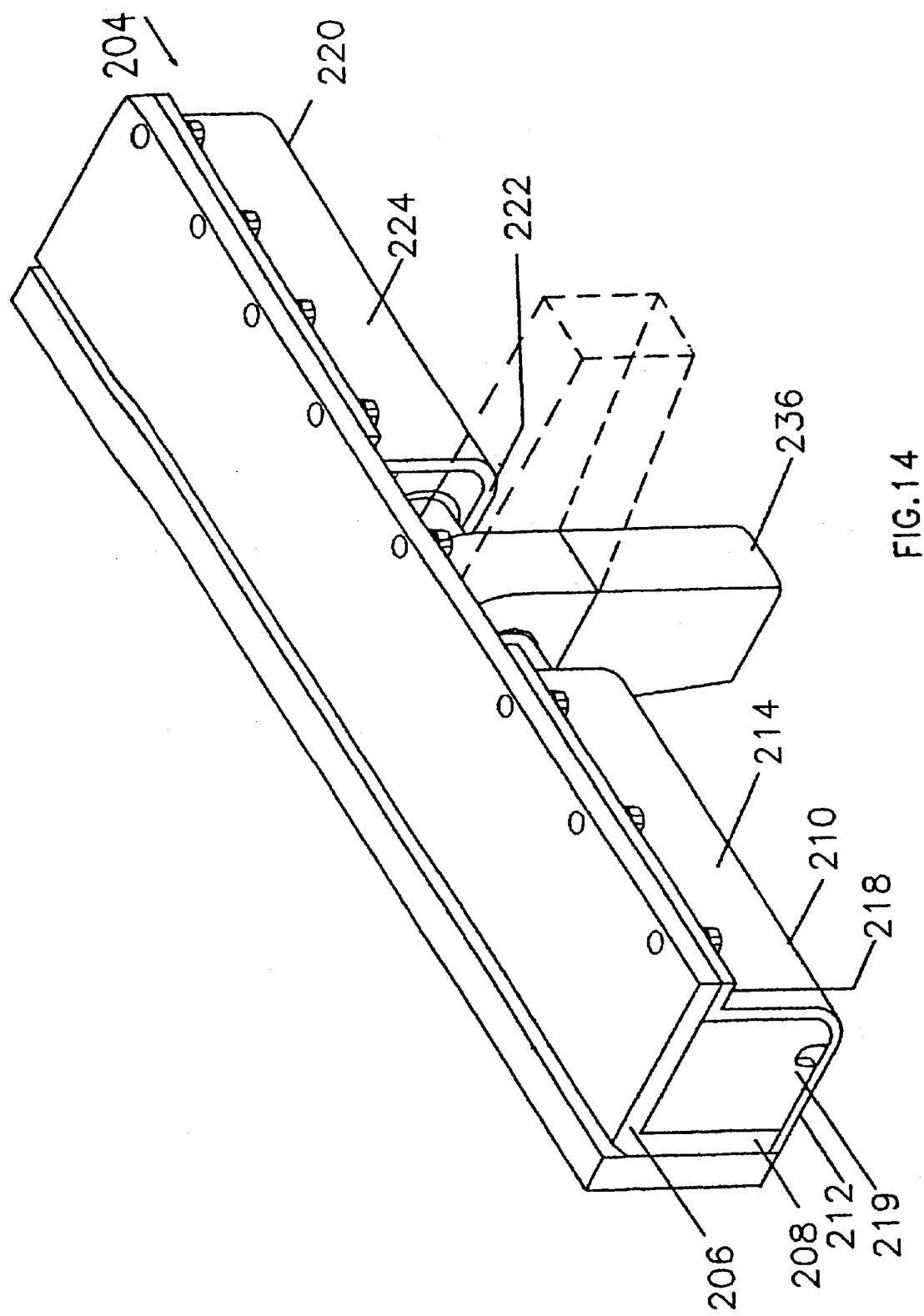
FIG. 14 is a perspective view of the housing and shaft according to an alternative embodiment of the invention.

Referring to FIG. 14, a bottom wall 212, an aft wall 214 and a port side wall 219 define a port section cover 210 of the housing. Cover 210 is formed as a single piece which is removably secured to the top wall 206 by means of bolts engaged through a flange portion 218 of the aft wall 214.

A starboard section cover plate 220 comprises a bottom wall 222, an aft wall 224 and a starboard side wall which are formed as a single piece which is removably secured to the top wall 206 by means of bolts. The cover plate 220 defines a starboard section of the housing 204.

The removability of the port and starboard cover plates contributes to the ease of repair and replacement of the operative components of the apparatus.

As best seen in FIGS. 15 and 16, two lug containment plates 226, 228 are provided as well as a centering spring abutment plate 230. Each of the plates extends downward from the top wall 206 and outward from the front wall 208.

Lug containment plate 228 acts as an inner side wall to the starboard section of the housing while lug containment plate 226 acts as an inner side wall to the port section. The centering spring abutment plate 230 is contained within the starboard section.

Figure 18:
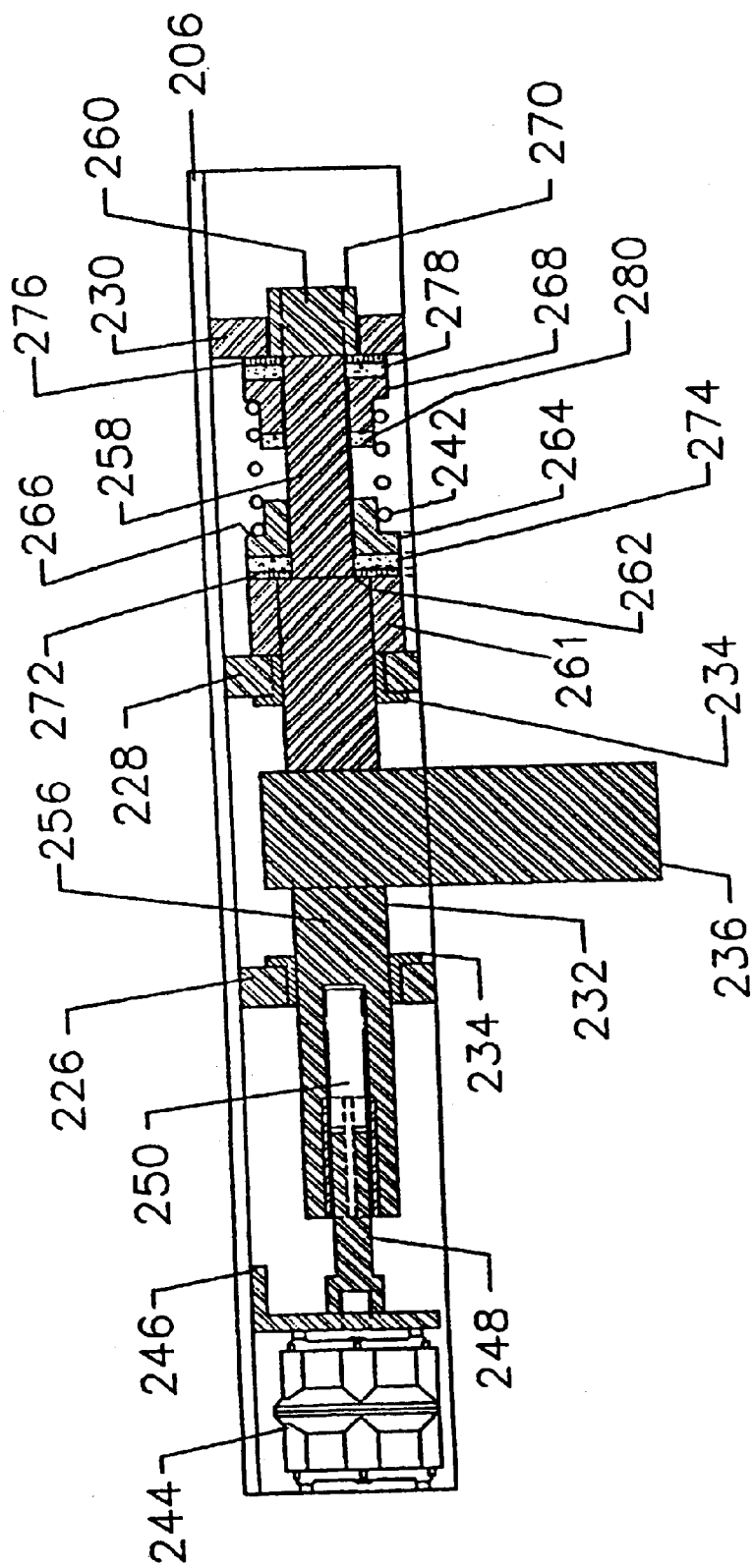

Referring to FIG. 18, a shaft 232 extends transversely of the apparatus through bearings 234 which are seated in openings in the lug containment plates 226, 228. An elongated lug 236 is retained on the shaft 232 between the lug containment plates 226, 228 by means of two bolts drilled and tapped into the shaft. Upon rotation of the shaft, the extended portion of the lug 236 may be presented in the downward position as indicated by the numeral 238 in FIG. 15, in which case it is disposed between the forks of the fifth wheel to prevent or limit jackknifing. When the shaft is rotated upwards as indicated by the numeral 240 in FIG. 15, the extended portion of the lug is withdrawn from between the forks.

The corners of the extended portion of the lug are preferably rounded such that when the lug is disposed between the forks, sharp corners which might damage the forks are avoided.

A centering spring 242 is provided on the shaft between centering spring abutment plate 230 and lug containment plate 228.

The port section includes a pneumatically actuated quarter turn rotary actuator 244. The actuator is controlled by air pressure derived from a pneumatic control system substantially as described above in relation to the first embodiment. However, the actuator may comprise other forms of actuators provided they are effective to selectively cause rotation of the shaft. The actuator must permit axial displacement of the shaft despite being operatively engaged to the shaft to cause it to rotate.

As illustrated in FIG. 16, an air reservoir 245 for emergency purposes is provided within the housing.

Referring to FIG. 18, actuator 244 includes a square axial drive shaft 248 which extends in the direction of the main shaft and into a square hollow axial channel 250 formed in the main shaft 232. Actuator 244 is attached by bolts to an actuator mounting bracket 246 which is secured to the top and front walls of the housing. The actuator end of the shaft 232 includes a cylindrical shoulder into which is fitted a circular key with a central square opening to receive the actuator drive shaft 248. The circular key is pinned to the shaft. The circular key provides the principal drive surface to transmit torque from the drive shaft 248 to the main shaft 232. Thus the main shaft 232 may slide axially along the longitudinal axis of the key while ensuring the transmission of the rotation of the actuator drive shaft to the main shaft.

Referring to FIG. 16, a locking cylinder 247 is provided with a plunger 249 which is aligned with an axial slot (not shown) in the side of the shaft 232 when the shaft is in the neutral position (when the lug 236 is not subjected to external lateral forces). Actuation of a control valve 251 by air regulator 253 causes the plunger 249 to extend into the slot so as to lock shaft 232 against rotational displacement to hold the lug in the raised or lowered position according of the location of the slot.

Referring now to FIG. 18, the main shaft 232 comprises a lug mounting and drive section 256 and a centering spring mounting section 258.

The lug mounting and drive section 256 and the spring mounting section 258 have lengths chosen to ensure that, even with the lug in abutment with either of the lug containment plates 226 or 228, the lug mounting and drive section 256 will still be retained in the bearings 234. Thus when the lug 236 is centered, section 256 projects beyond plates 226 and 228 a distance at least as great as the distance of maximum lateral travel of the lug in the opposite direction. The starboard end 260 of the spring mounting section extends through an opening provided in the spring abutment plate 230.

Referring to FIG. 16 and FIG. 18, the differing diameters of the two main shaft sections result in a shoulder between them as at 262. The shoulder 262 is relied on to provide an abutment surface between the lug mounting and drive section 256 and a spring retainer 264 and its associated components that are seated against the shoulder 262 or shaft section 258. The spring retainer 264 also includes a shoulder 266 against which the centering spring 242 abuts. A second spring retainer 268 is provided about the starboard end of the spring mounting section 258. The starboard end of the centering spring 242 is seated on the second spring retainer 268. A castellated lock nut 270 is provided at the starboard end of the spring mounting section for abutting against the spring retainer 268 when the main shaft 232 is displaced towards the port side. Thus, lateral displacement of the lug to port will in turn cause axial displacement to port of the shaft 232 and of the associated castellated lock nut 270 which in turn abuts spring retainer 268 urging it also to port and causing and compression of the centering spring 242.

When the lug and shaft are displaced to starboard, the shoulder 262 of the main shaft lug mounting and drive section 256 abuts spring retainer 264 and causes it to compress the centering spring 242. A bronze sleeve 261 is provided between the lug mounting and drive section 256 of the shaft 232 and the spring retainer 264.

When the lug is rotated on the main shaft so as to be positioned downward and between the forks of the fifth wheel, over-articulation of the trailer in relation to the tractor will cause the lug to be displaced laterally, i.e. axially in relation to the main shaft 232.

Lateral displacement of the lug and shaft to starboard will be limited by the abutment of the lug against the lug containment plate 228. Cushioning of the impact of the lug against the lug containment plate is as follows. As the lug reaches the containment plate, the shoulder 262 of the main shaft 232 will have compressed the shock absorbers 274, 280 and 278, but less than their maximum compression. Thus, the distance between the starboard end of spring retainer 264 and the port side of shock absorber 280 when the lug is at rest in the centered position is carefully selected to be slightly less than the distance from the side of the lug to the containment plate 228. The thickness of the shock absorbers and the axial length of the spring retainers are important in providing precise cushioning of the shaft when the lug reaches the lug containment plate. These lengths must be chosen such that the shock absorbers are then partially compressed. The centering spring is also chosen so that at maximum lateral displacement of the lug, it does not bottom out. It will be appreciated that the number of shock absorbers could be varied, and that at least one shock absorber would be effective.

When the main shaft undergoes maximum axial displacement away from the actuator (to starboard), the actuator drive shaft 248 is sufficiently long that it is still retained within the channel 250 of the main shaft 232.

When the lug is not subjected to any external forces, the centering spring 242 urges spring retainer 264 to push shoulder 262 until the spring retainer 264 is in full abutment sleeve 261. The centering spring 242 will also urge spring retainer 268 to push lock nut 270 until the spring retainer 268 (and the intermediate shock absorber 278) are in full abutment against spring abutment plate 230. When full abutment of the spring retainers on both sides is achieved, the shaft is centered. The lug is positioned on the shaft to be at a neutral position when the shaft is centered by the centering spring 242.

When the shaft is displaced to port, the castellated nut 270 acts to displace thrust washer 276, shock absorber 278, spring retainer 268 and shock absorber 280 to port with resulting partial compression of the shock absorbers as the lug reaches lug containment plate 226.

The foregoing description has spoken in terms of the spring retainers abutting against their respective plates. However in fact, a thrust washer 272 and a shock absorber 274 are interposed between the lug containment plate 228 and the spring retainer 264 and a thrust washer 276 and a shock absorber 278 are interposed between spring abutment plate 230 and spring retainer 268. An additional shock absorber 280 is provided at the port end of the spring retainer 268.

The shaft may be removed by first removing the port and starboard covers. The actuator mounting bracket 246 is then removed thereby withdrawing the actuator drive shaft 248 from the hollow channel 250 of the main shaft 232. The lock nut 270 at the starboard end of the main shaft 232 is removed and the bolts holding the lug 236 onto the main shaft are removed. The whole of the shaft 232 may then be drawn out of the port side. This allows replacement or repair of the shaft and the other components of the apparatus where necessary.

It will be appreciated by those skilled in the art that certain variations may be made to the preferred and alternative embodiments described herein without departing from the scope of the invention.

What is claimed is:

1. An anti-jackknifing apparatus to reduce articulation between a tractor having a fifth wheel with diverging forks defining a slot therebetween and a trailer having a king pin adapted to be engaged between the forks of the fifth wheel, comprising:
   (a) a shaft having a central longitudinal axis mounted to extend transversely with respect to the trailer;
   (b) a lug mounted on the shaft; and
   (c) a rotary actuator having a body operatively engaged with the shaft and being arranged such that the central longitudinal axis of the shaft extends through a portion of the body of the rotary actuator, the rotary actuator being operative to cause rotation of the shaft whereby the lug pivots into or out of the slot between the diverging forks of the fifth wheel.

2. The anti-jackknifing apparatus of claim 1, further comprising a removable housing enclosing the rotary actuator.

3. The anti-jackknifing apparatus of claim 2, wherein the removable housing encloses at least a portion of the shaft.

4. The anti-jackknifing apparatus of claim 1, further comprising a mounting plate adapted to be attached to a portion of the trailer, the removable housing being removably attached to the mounting plate, the shaft being mounted for slidable movement on the mounting plate.

5. The anti-jackknifing apparatus of claim 4, further comprising a spring mounted about a portion of the shaft for urging the shaft to a central position with respect to the mounting plate.

6. The anti-jackknifing apparatus of claim 5, further comprising a plurality of abutment surfaces attached to the mounting plate, each of the abutment surfaces including a passageway through which the shaft extends, and a plurality of compressible washers arranged on the shaft and being adapted to be compressed against respective ones of the abutment surfaces.

7. The anti-jackknifing apparatus of claim 1, wherein the shaft is a compound shaft comprising sections of different diameters.

8. The anti-jackknifing apparatus of claim 1, further comprising a sensor for detecting the degree of rotation of the shaft and transmitting a signal indicative of the degree of rotation of the shaft to receiving means in the tractor.

9. The anti-jackknifing apparatus of claim 8, further comprising a pneumatic device operatively connected to the rotary actuator whereby selective rotation of the shaft is obtained.

10. The anti-jackknifing apparatus of claim 8, further comprising a warning device arranged in the tractor, the warning device being electrically connected to the sensor and being adapted to provide a warning signal to a driver of the tractor in response to signals sent by the sensor.

11. The anti-jackknifing apparatus of claim 1, further comprising a proximity sensor for detecting when the shaft has been displaced a predetermined longitudinal distance from the rotary actuator as it slides toward and away from the rotary actuator.

12. An anti-jackknifing apparatus to reduce articulation between a tractor having a fifth wheel with diverging forks defining a slot therebetween and a trailer having a king pin adapted to be engaged between the forks of the fifth wheel, comprising:
   (a) a shaft having a central longitudinal axis mounted to extend transversely with respect to the trailer, the shaft being longitudinally displaceable along its central longitudinal axis and being rotatable thereabout;
   (b) a lug mounted on the shaft; and
   (c) a rotary actuator operatively engaged with the shaft to cause rotation thereof whereby the lug pivots into or out of the slot between the diverging forks of the fifth wheel, the rotary actuator being mounted substantially co-linearly with the longitudinal axis of the shaft, the shaft being slidable toward and away from the rotary actuator as the shaft becomes longitudinally displaced along its central longitudinal axis.

13. The anti-jackknifing apparatus of claim 12, further comprising a removable housing enclosing the rotary actuator.

14. The anti-jackknifing apparatus of claim 13, wherein the removable housing encloses at least a portion of the shaft.

15. The anti-jackknifing apparatus of claim 12, further comprising a mounting plate adapted to be attached to a portion of the trailer, the removable housing being removably attached to the mounting plate, the shaft being mounted for slidable movement on the mounting plate.

16. The anti-jackknifing apparatus of claim 15, further comprising a spring mounted about a portion of the shaft for urging the shaft to a central position with respect to the mounting plate.

17. The anti-jackknifing apparatus of claim 16, further comprising a plurality of abutment surfaces attached to the mounting plate, each of the abutment surfaces including a passageway through which the shaft extends, a plurality of compressible washers arranged on the shaft and being adapted to be compressed against respective ones of the abutment surfaces.

18. The anti-jackknifing apparatus of claim 12, wherein the shaft is a compound shaft comprising sections of different diameters.

19. The anti-jackknifing apparatus of claim 12, further comprising a sensor for arranging to detect the degree of rotation of the shaft and transmitting a signal indicative of the degree of rotation of the shaft to receiving means in the tractor.

20. The anti-jackknifing apparatus of claim 19, further comprising a pneumatic device operatively connected to the rotary actuator whereby selective rotation of the shaft is obtained.

* * * * *

UNITED STATES PATENT AND TRADEMARK OFFICE
CERTIFICATE OF CORRECTION

PATENT NO. : 6,746,035 B1
DATED : June 8, 2004
INVENTOR(S) : N. L. Williams

It is certified that error appears in the above-identified patent and that said Letters Patent is hereby corrected as shown below:

Column 1,
Line 3, insert -- CROSS REFERENCE TO RELATED APPLICATIONS --.

Signed and Sealed this

Tenth Day of August, 2004

JON W. DUDAS
*Acting Director of the United States Patent and Trademark Office*